United States Patent [19]

Parent et al.

[11] Patent Number: 4,600,083
[45] Date of Patent: Jul. 15, 1986

[54] POSITIONING SYSTEMS

[76] Inventors: Christopher A. Parent, 187 Woodbrook Ter., West Springfield, Mass. 01089; James R. Voss, 6 Eastwood Dr., Wilbraham, Mass. 01095

[21] Appl. No.: 647,746
[22] Filed: Sep. 6, 1984
[51] Int. Cl.⁴ .................. B66B 11/04; G01D 15/16; B43L 13/00
[52] U.S. Cl. .......................... 187/7; 187/20; 33/1 M; 346/139 B; 74/89.22
[58] Field of Search .............. 187/6, 7, 26, 17, 20; 33/1 M; 346/139 B; 74/89.22

[56] References Cited
U.S. PATENT DOCUMENTS

| 292,989 | 2/1884 | Clark | 187/7 |
|---|---|---|---|
| 2,675,291 | 4/1954 | Webster | 33/1 M X |
| 2,746,151 | 5/1956 | Kennedy | 33/1 M |
| 2,785,941 | 3/1957 | Macklem et al. | 33/1 M X |
| 4,315,437 | 2/1982 | Etcheparre et al. | 33/1 M X |

FOREIGN PATENT DOCUMENTS

| 259889 | 2/1968 | Austria | 346/139 B |
| 0074190 | 3/1983 | European Pat. Off. | 346/139 B |

Primary Examiner—Joseph J. Rolla
Assistant Examiner—Nils E. Pedersen
Attorney, Agent, or Firm—Ross, Ross & Flavin

[57] ABSTRACT

An x-y positioning device in which a cable or chain is used to drive a carriage, powered by two motors. The same cable that moves the carriage also constrains the angular orientation of the moving mechanism. In so doing, the moving parts can be made lighter and less expensively, while providing improved dynamics. All is advantageously applied to large, flat-bed plotters, to a computerized engraver, to a large sign painter, or to an elevator.

4 Claims, 19 Drawing Figures

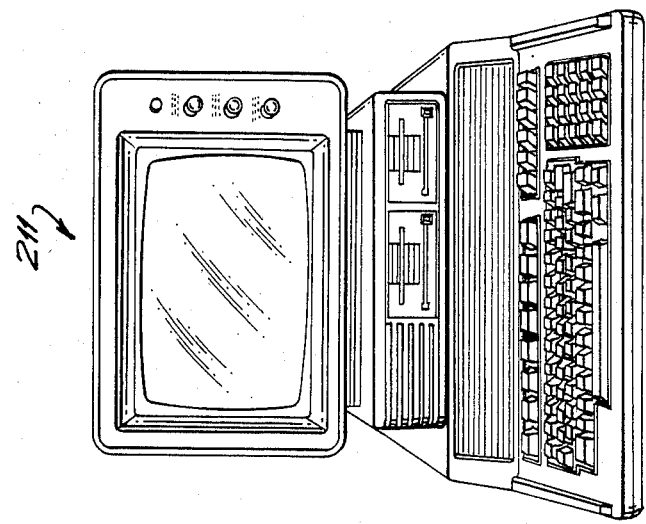
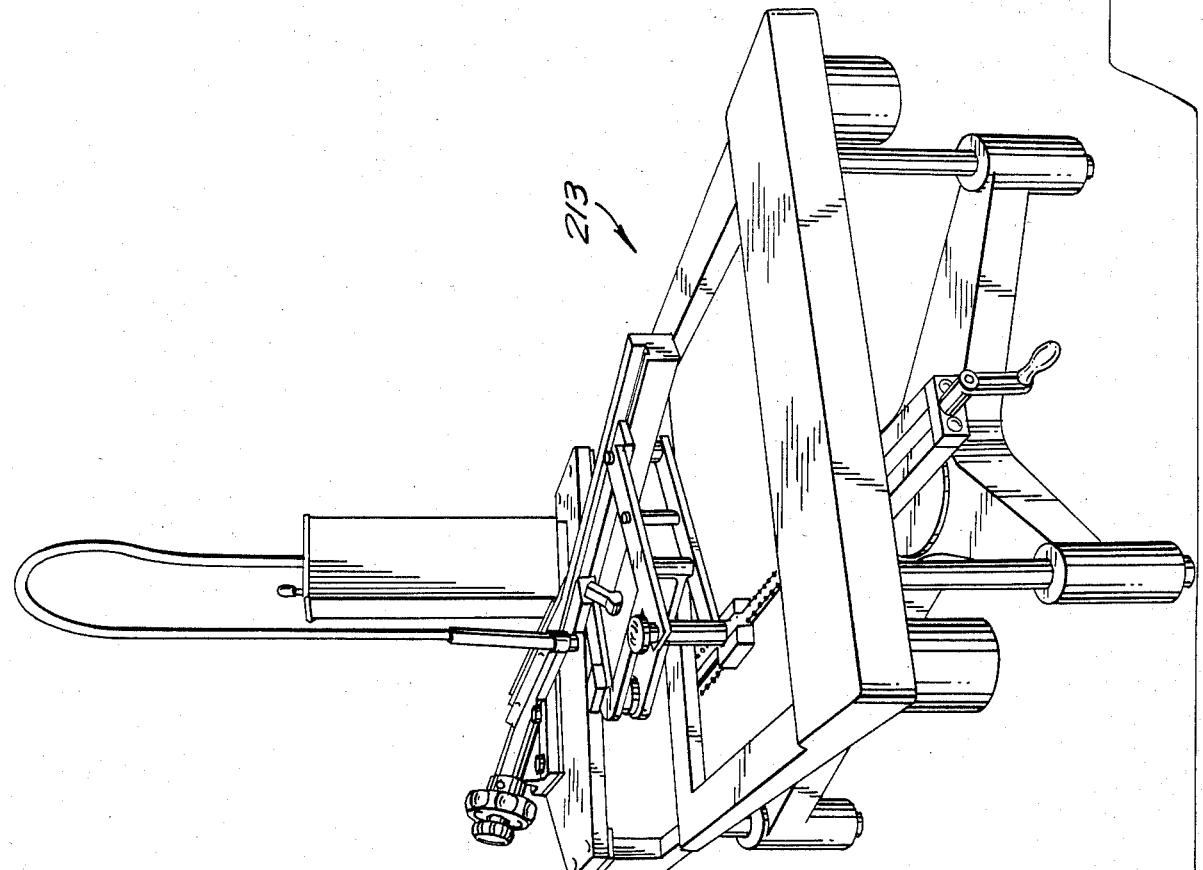
FIG. 2

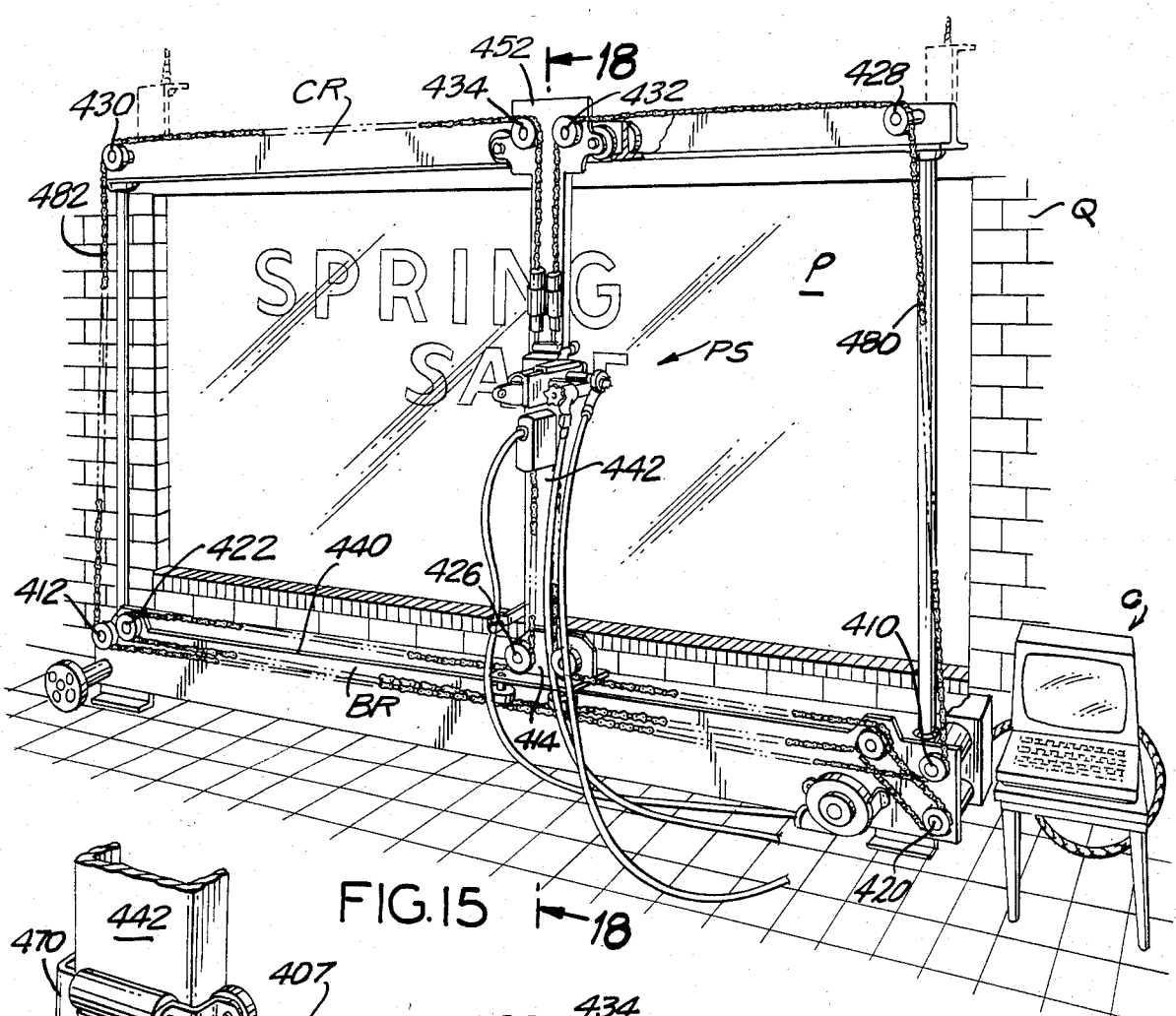
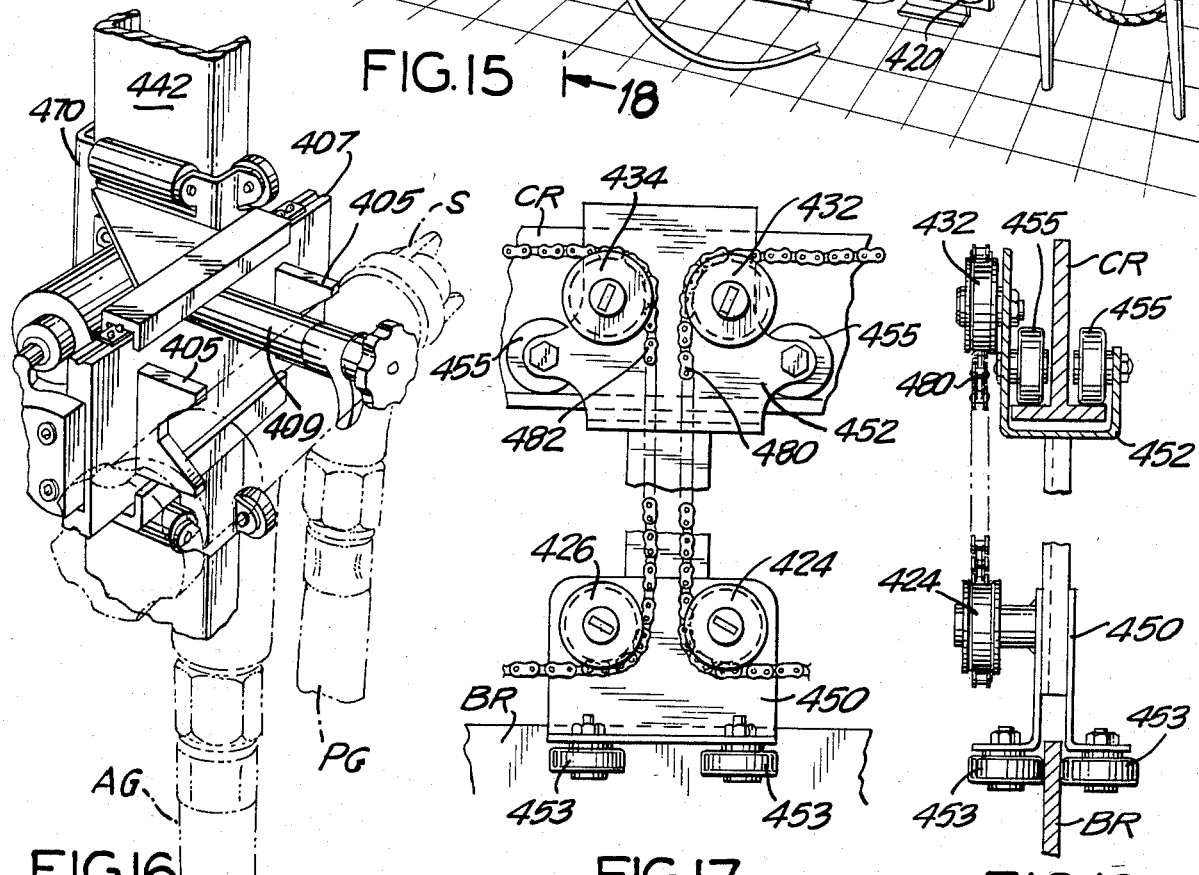
FIG.15
FIG.16  FIG.17  FIG.18

POSITIONING SYSTEMS

The present invention relates generally to new and useful improvements and structural refinements in motive power systems involving computerized drive mechanisms having general utility in the arts, and more particularly aims to provide improvements in the means for driving a carrier via fixed-position driving motors, the motion being transmitted via a chain.

The invention, in broader aspects, may be embodied in any device embodying a positioning system in two dimensions known as a rectangular drive or X-Y drive device.

In what are believed to be new and novel practical applications, the elucidated concept has been embodied into a practical use for accomplishing certain functions in a new and novel way and exemplifications are herein given showing the movement of an engraving tool relative to a workpiece, the movement of a plotter over a planar surface, the movement of a sign painting mechanism over a vertically-disposed surface, and the movement of an elevator car relative to a vertical wall of a housing such as an office building, hotel or the like, the wall containing a plurality of doors leading thereinto.

Admittedly, the idea of following in mutually orthogonal directions via a computer-operated mechanism is not new. Likewise it is to be admitted that per se cable-driven plotters and computer-controlled engravers are not new.

Without intending to place undue limitations upon the scope of the invention, beyond what may be required by the state of the prior art, the particular embodiments may be briefly defined as each embracing the concept of a positioning system involving a rectangular or X-Y drive where a pair of driving motors have a capacity for moving a carrier in arbitrary motions over a defined area. Desirably, such device would be computer-controlled.

The driving motors function separately or unisonly through appropriate trains to drive the carrier over a planar area.

Rotation of either motor alone will be seen to move the carrier diagonally. The desired positioning is normally attained by the simultaneous rotation of both motors.

We provide a positioning system of the above-defined character in which ruggedness and durability of construction are combined with simplicity and ease of use and protection against usual but hard conditions of practical use resulting in an apparatus which effectively meets the normal requirements therefor and performs its functions in a practical and dependable manner.

Further, while the components are uniquely compact, they are nevertheless readily accessible for repair and replacement purposes with a consequent reduction in maintenance costs over related devices heretofore known.

Other objects and purposes hereof are to provide advantageous structural and operational features in devices of the class to which reference has been made so as to offer an apparatus having the following inherent meritorious characteristics: first, engineeringwise, a low cost in production and uniqueness in design of coacting parts wherefor the components are coordinated for facile assembly; second, a susceptibility to easy installation, third; a high degree of efficiency and dependability in its operational use; fourth, the securement of a higher degree of accuracy and greater degree of variety in the manner of work performed therewith than has heretofore been possible with prior devices known in the art; fifth, the attainment of a convenience of arrangement of parts and a flexibility or a capability of adjustment by which a variety of work can be produced by means of the same device; and sixth, the provision of such other improvements in and relating to positioning systems of the type above referred to as are hereinafter described and claimed.

The invention delineates a rectangular drive system with the significant characteristic that the ultimate positional accuracy of the driven member is maintained while using small and lightweight first and second carriages. The motion of the driven member or carrier is provided by a chain which is motivated by motors fixedly mounted on a base. The chain is attached directly to the driven member, eliminating the possibility of lost motion between the motor drivers and the driven member.

The chain travels over fixed pulleys mounted on the base and over movable pulleys mounted on the carriages.

The stringing of the chain is such that the angular orientation of the first carriage is maintained entirely by the chain and not at all by its constraining guide rail. It is this feature which makes possible a mechanism lightweight, and compact in size and low in cost of production.

To make relatively large versions of the system, it is only necessary to increase the lengths of the chain and guide rails. Although the chain and guide rails would need to grow in sizes in order to maintain the necessary rigidity over larger spans, the cost and weight penalties would be slight as compared to those in the cases of known prior designs.

Since the positional accuracy of the driven member is ultimately determined by relative motions between the operating members, closely fit rigid structures are dictated while still allowing smooth and free motions between the components.

The motion of the driven element is constrained in one direction by a stationary structure in the form of a rigid bar or guide rail. The mechanism used to drive the driven element in a direction parallel to the guide rail is mounted on the stationary base. Size, weight and location being relatively unimportant, good positional accuracy, repeatability and rigidity are readily realized.

Although the employment of a pair of straight guide rails hinged and one being pivotable relative to the other is dictated, the positional accuracy is actually determined by the chain. That is, no fixed angle is required to be structurally maintained by the guide rails.

Further objects are to provide a positioning system conformable to the desiderata of the preceding paragraphs and offering specific improvements in its various operating instrumentalities, which themselves are minimum in number, wherefor it is simple and compact in accordance with the demands and desires of manufacturers and customers alike and so as to provide distinct advantages in that it is practical in value, durable in organization, reliable in operation, and efficient in use.

These foregoing objects and other incidental ends and advantages characterize the device of the invention, and distinguish it from previously known devices of a kindred nature.

Although the law requires a full and exact description of at least one form of the invention, and several follow, it is, of course, the purpose of the patent to cover the inventive concept therein no matter how it may later be disguised by variations in form; and the appended claims are intended to accomplish such purpose by particularly pointing out the combinations in which the inventive concept may be found.

The invention possesses other objects and features of advantage, some of which, with the foregoing, will be set forth in the following description of our invention. We do not limit ourselves to this disclosure of species as we may subsequently adopt variant embodiments thereof within the scope of the claims.

Other specific objects and advantages of the invention will become apparent to those skilled in the art from the following description of the preferred embodiments taken together with the accompanying drawings.

In the drawings:

FIG. 2 is a view in perspective of an engraving mechanism employing the system of the invention and its cooperant computer;

FIG. 15 is a view of the principles of the invention applied to a sign painting mechanism;

FIG. 16 is a fragmentary isometric view of the painting mechanism shown in FIG. 15;

FIG. 17 is a broken enlarged view of certain of the roller means of the FIG. 15 mechanism;

FIG. 18 is a broken enlarged view taken on line 18—18 of FIG. 15; and

Figure 1:
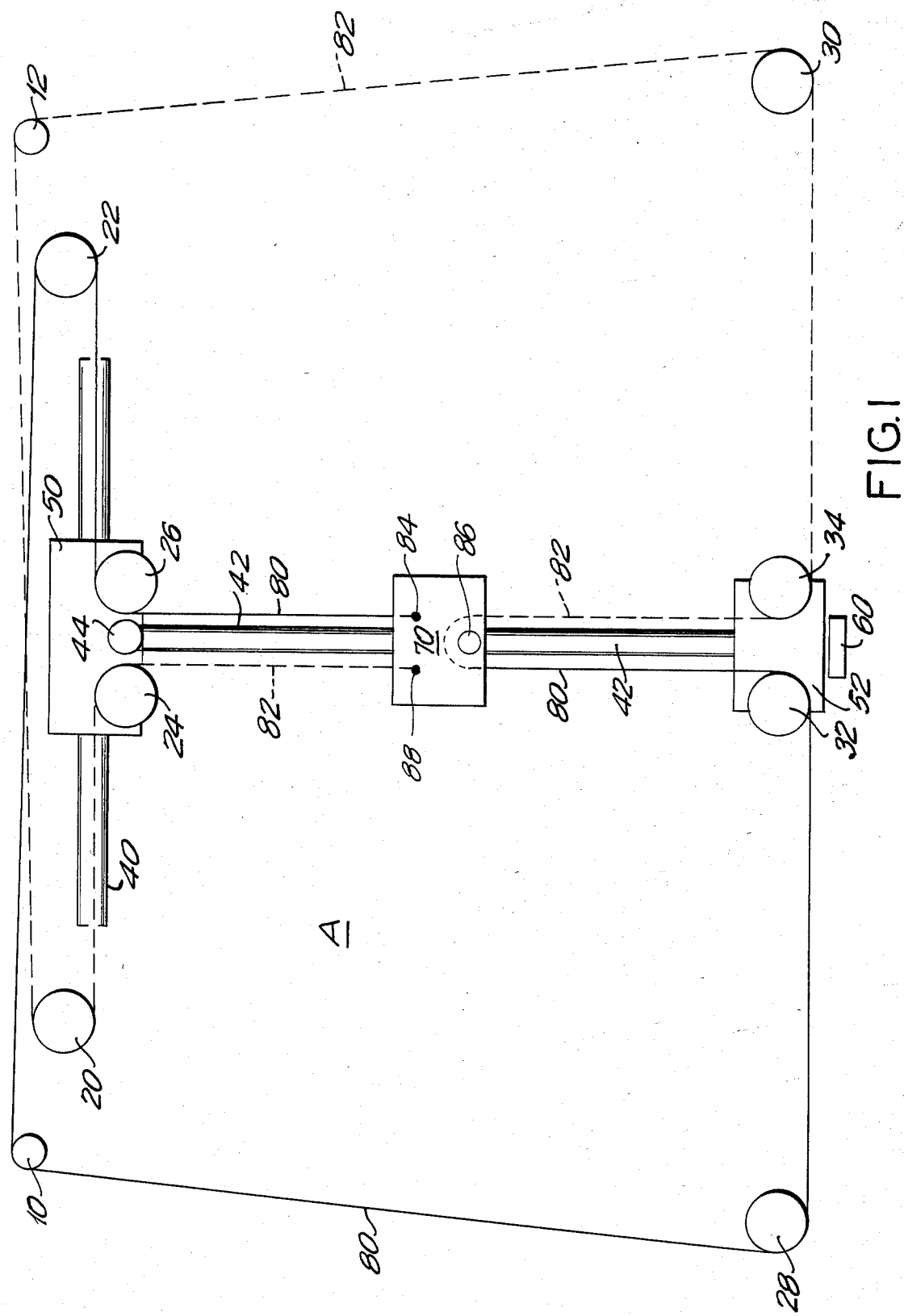
FIG. 1 is a simplified schematic view dramatising the basic concept of the invention.
Figures 3, 4, 5:
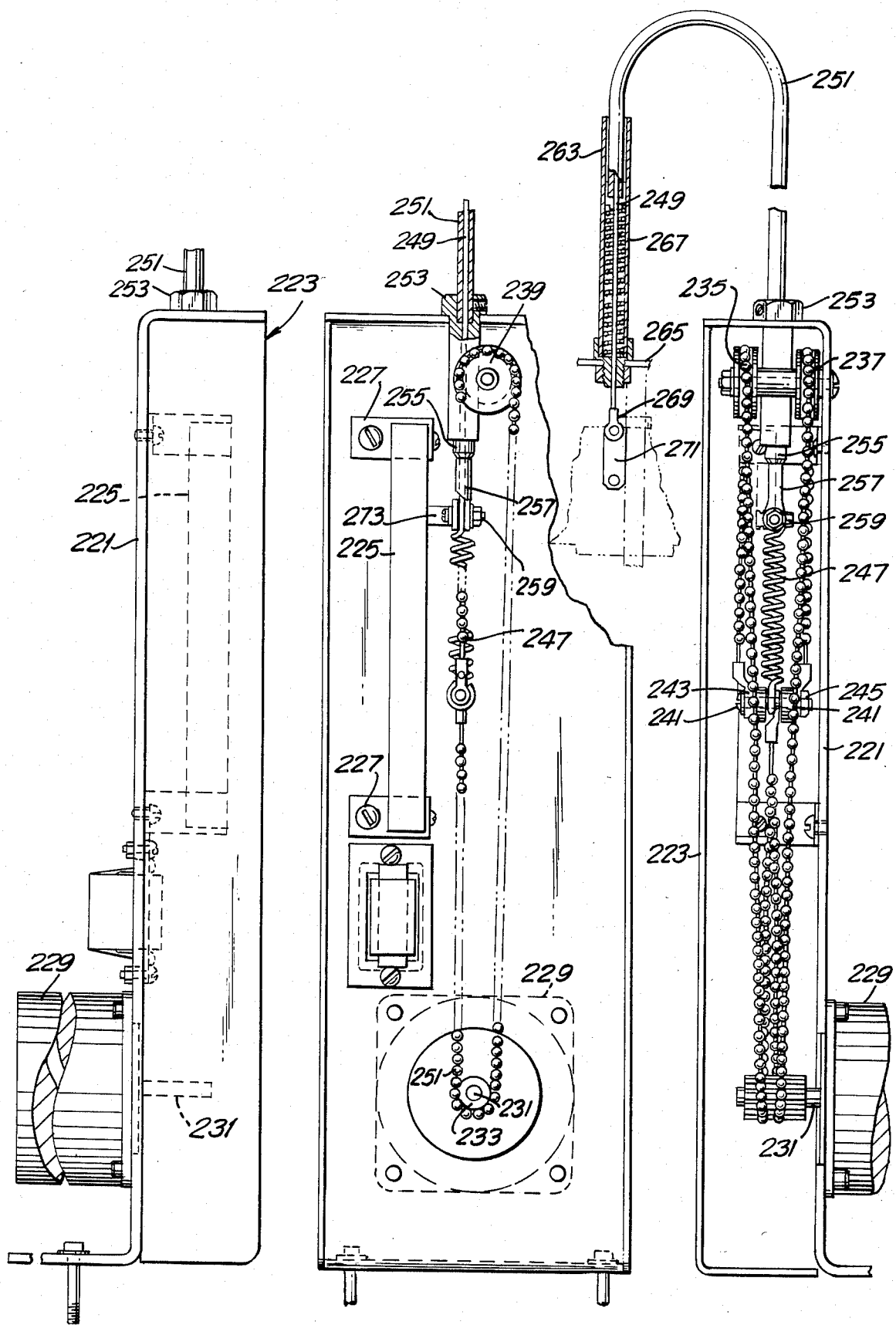
FIG. 3 is an end elevational view of the stylus actuator of the FIG. 2 engraving mechanism.
FIG. 4 is a side elevational view of the stylus actuator.
FIG. 5 is a side elevational view of the stylus actuator.
Figure 6:
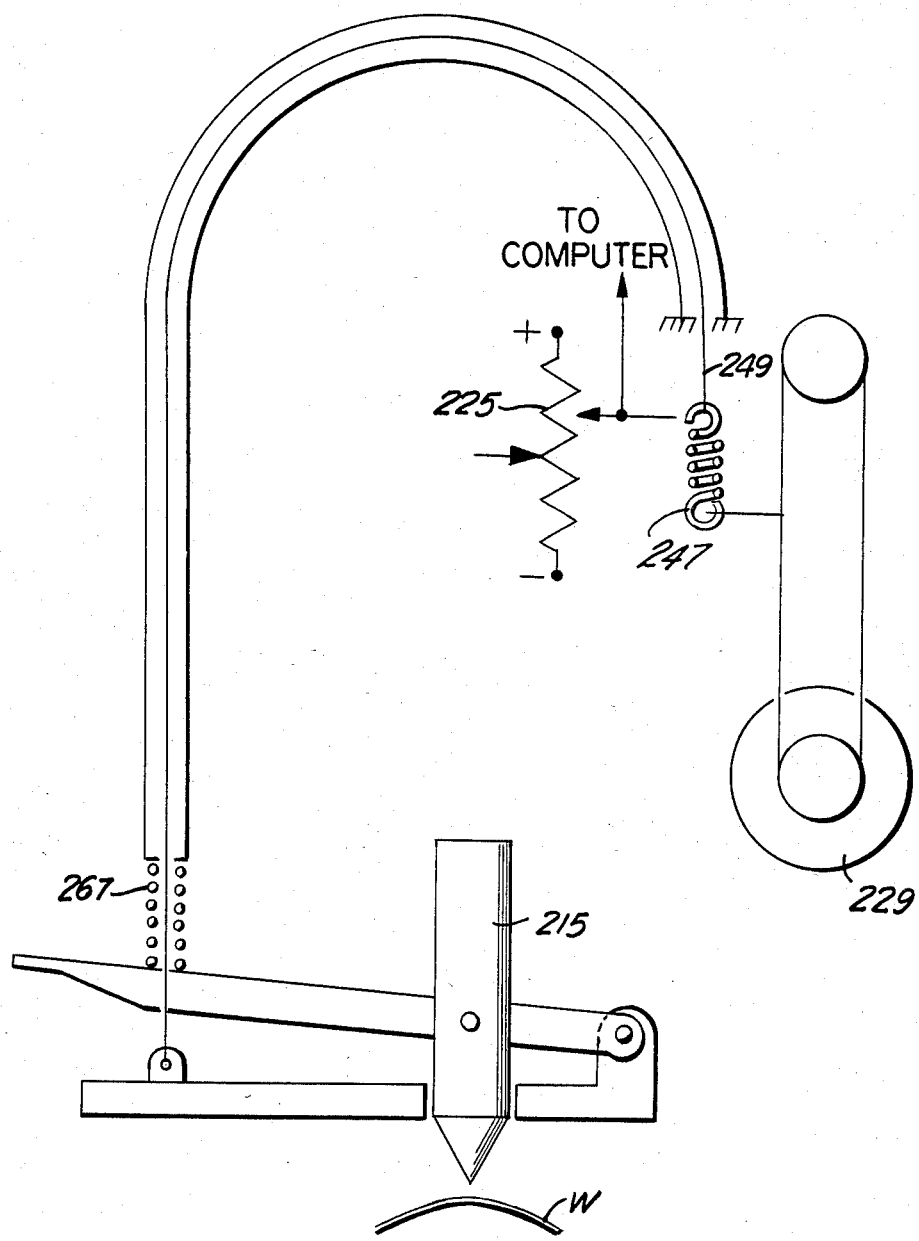
FIG. 6 is a schematic view illustrating the principal of operation of the stylus actuator.

Reference is first made to the basic concept as dramatized in the simplified FIG. 1 showing.

Here are shown a pair of fixed-position drive motors 10 and 12 fixed on a base A, a sequential series of pulleys 20, 22, 24, 26, 28, 30, 32 and 34, a fixed guide rail 40, a movable guide rail 42 normally perpendicularly-disposed as to guide rail 40 but pivotable relative thereto by means of a pivot or hinged joint 44, a pair of spaced carriages 50 and 52, a carriage 50 mounting pulleys 24 and 26 and being movable along fixed guide rail 40, carriage 52, mounting pulleys 32 and 34 and being fastened to the end of movable guide rail 42, and a carrier 70 slidably mounted on movable guide rail 42. Pulleys 20 and 22 are mounted on base A.

A chain will be considered to consist of two parts, namely part 80, represented by solid lines, and part 82, represented by dash lines which chain is entrained in turn about the freely rotatable drive pulleys of the drive motors and the pulleys as will be described for driving and orienting carrier 70.

In following the chain train, one terminus of chain part 80 is seen to be fixed to a post 84 on carrier 70 and is entrained over pulleys 26 and 22, thence over the drive pulley of drive motor 10, and thence is entrained over pulleys 28 and 32 before return to the carrier where it is looped over a retainer 86, then passing outwardly from the carrier as chain part 82 for passage over pulleys 34 and 30, thence over the drive pulley of drive motor 12, and thence over pulleys 20 and 24 before return to the carrier when the opposite terminus is fixed to a post 88.

It is best to consider each chain part 80, 82 separately or individually in order to appreciate more readily the capability of the chain parts to orient carrier 70 and hold same in desired orientation.

Assume first a rotative motion in drive motor 10, in a counterclockwise direction as viewed in FIG. 1, and assume further for the moment that drive motor 12 is non-rotative. The motion of carrier 70 will be upward and rightward, again as viewed in FIG. 1.

Clockwise rotation of drive motor 10, still with drive motor 12 remaining idle, will see the motion of the carrier as being downward and leftward.

In a symmetrical way, if drive motor 12 rotates while drive motor 10 is non-rotative, the carrier is otherwise driven. Counter clockwise rotation of drive motor 12 causes the carrier to move downward and rightward whereas clockwise rotation causes movement upward and leftward.

By combining and controlling the relative rotations of motors 10 and 12, obviously any desired motion of the carrier is achievable.

In every case, the resultant motion is caused by the responsiveness of one of the chain parts to the movement of the other of the chain parts.

With no initial slack in chain part 80, its tensioning will not change when carriage 70 is moved in translation. Too, it will not offer any interference to the clockwise rotation of the carriage assembly around pivot 44, although counterclockwise rotation of the assembly around the pivot would be precluded by chain part 80. Similarly, chain part 82 would offer no interference with any translation of the carriage assembly but would prevent any clockwise rotation of the carriage assembly around pivot 44, although counterclockwise rotation around the pivot would be allowed.

Combining the effect of both chain parts, the carriage assembly is free to translate but is rigidly held in angular orientation. Retainer 86 holds the ends of the chain parts thereby establishing their lengths and by moving within this retainer one chain part is lengthened while the other is shortened, thereby changing the angular orientation of the carriage assembly.

It should be incidentally noted that if carrier 70 were moved along movable guide rail 42, the chain parts would move over their pulleys, but would not interfere with the motion.

Again, to illustrate the motion of carrier 70, let drive motor 10 rotate in the clockwise direction while drive motor 12 holds chain part 82 still at the motor. As drive motor 10 rotates clockwise, chain part 80 is drawn from pulleys 28 and 32 and released to pulleys 22 and 26. The chain motion described would tend to move carrier 70 down and move the carriage assembly to the left or to move the carriage assembly and the carrier. However, either motion would cause chain part 82 to move.

If the carrier were to move down while the carriage assembly did not translate, chain part 82 would have to move the drive pulley at drive motor 12 in counter clockwise direction. On the other hand, if the carriage assembly were to move to the left without the carrier moving down, chain part 82 would cause the drive pulley at drive motor 12 to rotate in clockwise direction.

Since motor 12 is not rotative in this example, the motion of the carriage assembly and the carrier must have equal motions to the left and down when the drive motor 10 rotates in clockwise direction. If drive motor 10 is rotated in the counter clockwise direction with drive motor 12 non-rotative, the motion of the carrier would be up and to the right.

Contrariwise, if drive motor 12 rotates while drive motor 10 is not rotating, the carrier is driven in other directions. Counter clockwise rotation of drive motor 12 causes the carrier to move down and to the right whereas clockwise rotation causes rotation up and to the left.

As aforesaid, by combining the rotations of drive motors 10 and 12, any motion of the carrier is possible.

Reference is now made to FIGS. 2–7, same representing an exemplification of an engraver with the drive mechanism being exploited to drive a diamond stylus to a correct position relative to a workpiece combined with a means for effecting movement of the stylus on command, lowering it into or raising it from the engraving position.

Computer 211 is associated with the actuating mechanism mounted on the engraving work table indicated by 213.

The drive mechanism is used as a component of an automated designing system in combination with the computer, the system envisioning the conversion of data of a plot plan to algorithmic form acceptable to the computer, which data is oriented within the computer memory and is then converted from the computer memory to a visibly useful form.

The actuating mechanism envisions generally an electric stepper motor 229, a bowden wire 249 for transferring motion and force from the motor assembly to an inscribing stylus 215, a pair of spring means 247 and 267 for pressing the stylus against workpiece W, and a potentiometer 225 for sensing or locating the workpiece surface and for calibrating the spring force.

Conceptually, the system functions thus: when it is desired to move stylus 215 into the engrave position, computer 211 moves stepping motor 229 counterclockwise. The stylus, being initially free, is driven toward the work through bowden wire 249 and the pair of cooperant springs, with little length change actuate a potentiometer 225 moving at approximately the same rate as the drive chain of the mechanism.

Stylus 215 is movable over the work table by the drive mechanism and operationally is driven to the engrave position over workpiece W fixed by the usual mounting means (not shown) supported upwardly of the work table.

Initially, the stylus is free, that is, in withdrawn upward position, as it is driven to the desired position over the workpiece.

Once in position, the stylus is motivated toward the work through actuation of the bowden cable, its spring steel wire being enclosed within a casing 251 and functioning for transmitting a longitudinal motion, especially around a curve to a point at a distance from where the motion is initiated and around the curvature in the cable and casing, the same lending themselves to such ready manipulation, as is known.

To move stylus 215 to its operating position, computer 211 will move a stepping motor 229 counterclockwise.

The stylus actuating mechanism is enclosed within a housing comprised of a mounting plate 221 and a cover 223.

Potentiometer 225 is enclosed within the housing, being mounted relative to mounting plate 221 by means of mounting clips 227.

Stepping motor 229 is mounted on mounting plate 221 externally of the housing, which motor mounts a drive shaft 231 supporting a drive sprocket 233 around which the lower reaches of bead chains 235 and 237 are entrained.

Vertically above and spaced from drive sprocket 233 are a pair of coaxially aligned pulleys 239 mounted on a pulley spacer so as to be spaced from each other and around each of which pulleys the upper reach of a bead chain is entrained.

The free ends of the bead chains are then extended downwardly to the opposite sides of spaced spring spacers 241 and held fixed as to each other by a screw 243 and nut 245.

An extension spring 247 is fixed at its lower extremity to screw 243 between spring spacers 241 and at its upper extremity to the inboard terminus of bowden wire 249 sleeved in casing 251, the casing being held relative to the housing by a cable sleeve anchor 253 and a set screw radially extended thereinto.

The lower extremity of cable sleeve anchor 253 sleeves a stop bumper 255 through which the bowden wire extends and is receivable in a crimp-ring terminal, which terminal is held by a screw and nut assembly 259 which also mounts the upper terminus of extension spring 247.

The opposite extremity of the bowden cable extends through a cable guide 263, the lower end of which cable guide is sleeved in and held by a cable guide base 265.

A compression spring 267 is sleeved around the bowden cable and within the cable guide, seating between the end of the bowden cable casing and the cable guide base.

The bowden cable terminates and is connected to a terminal crimp ring 269 which supports a downwardly-depending anchor cable 271.

Potentiometer 225 is connected to extension spring 247 by a crimp ring 273, which crimp ring is fixed to the extension spring and is slidable relative to the potentiometer.

As the stylus contacts the work surface, its downward vertical motion is stopped. Subsequent movement of the chain driven by the stepping motor is absorbed by the springs.

As spring 267 is compressed, it develops a force which is applied through its linkage to the stylus. The force exerted by spring 247 is the same as the force exerted by spring 267.

The force in spring 247 is present only after spring 247 has been extended by the motion of the chain.

During the initial motion, spring 247 does not lengthen and the potentiometer motion is nearly the same as the chain motion.

The computer, sensing the chain movement responsive to the commands of the stepping motor, knows how far the potentiometer must move if spring 247 is to stay at a constant length.

The difference between the expected motion of the potentiometer with the constant length of spring 247 and the measured motion of the potentiometer is a measure of the extension of spring 247 and accordingly the force in the stylus.

Figure 7:
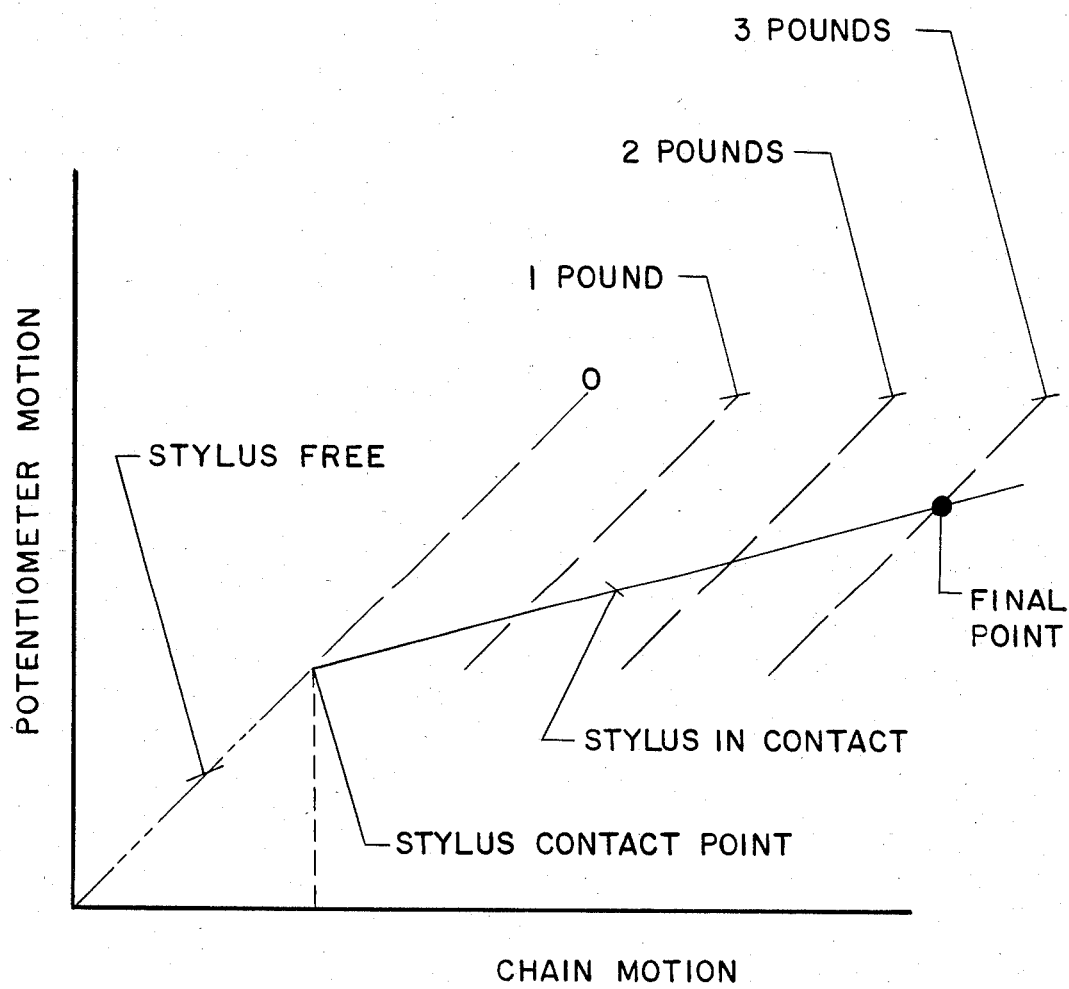
FIG. 7 is a graphic representation showing the operation of the stylus actuator.

With reference to FIG. 7, the computer algorithm determines when the force at the stylus is equal to the requested value tests for a greater or equal value of the difference between the stepping motor motion and the potentiometer motion. This criterion is shown graphically. Same is shown as somewhat idealized as deviations resultant from friction are not here taken into account.

Per the plane cartesian coordinate system where the abscissa represents the extent of chain motion and the ordinate represents the extent of potentiometer motion, the coordinates are representative of three typically requested forces, namely 1 pound, 2 pound and 3 pound.

Illustratively, imagine the requested force to be 3 pounds. Computer detection would operate to stop the chain motion when the algorithm sensed the crossing of the 3 pound line.

As the stylus contacts the work surface, it stops its vertical motion. Subsequent movement of the chain driven by the stepping motor is absorbed by the two springs. As one spring is compressed, it develops a force which is applied through its linkage to the stylus. Except for certain frictional losses in the bowden cable, the force exerted by the other spring is the same as the force by the first spring. This force in the second spring is present only after the spring has been extended by the motion of the chain.

During the initial motion, the second spring essentially does not lengthen and the potentiometer motion is nearly the same as the chain motion. The computer knows how far the chain moves in response to the commands to the stepping motor, so that it knows how far the potentiometer must move if the second spring is to stay at constant length. The difference between the expected motion of the potentiometer with the constant length of the second spring and the measured motion of the potentiometer is a measure of the extension of the second spring and therefore the force in the stylus.

If the problem of raising and lowering the stylus were straightforward, that is raising it to a first fixed height in the non-operating mode and lowering it to second fixed height in the operating mode, the matter of actuator design would not be too complicated. Problems are compounded however in the presence of curved or other non-horizontal planar surfaces of the work which dictate that stylus positioning adjust to and compensate for such irregularities.

Reference is now made to FIGS. 8–14, same representing an exemplification of an X-Y plotter over a planar surface for a graphical display of data with the drive mechanism being exploited to drive a pen or writing stylus to a correct position relative to a workpiece combined with a means for effecting movement of the pen on command according to signals from a computer, lowering or enabling it into writing position and raising or disabling it away from writing position.

As envisioned, the data is graphically displayed by the pen carried by the X-Y mechanism which may be positionable in response to a computer's digital signals.

The X-Y mechanism may be used to plot a mathematical function as a series of straightline segments, the first of which may begin from a selected starting point on a writing medium such as a graph and the last of which may terminate at a selected finishing point.

Conceivably, the first point to be plotted may not be coincident with the origin point of the X-Y coordinates, in which case the pen must be disabled while being moved to the first point to be plotted, and therefollowing the pen must be enabled and remain so enabled to draw a line or a series of connected line segments between successive points as computer dictated.

As known, the computer may produce data representative of mathematical functions, for example, which may be graphically displayed by the X-Y plotter.

A pen position control circuit will include digital-to-analog converter circuitry which controls the X and Y movements of the pen.

The coupling between the pen position control circuitry of the computer and the X-Y plotter may be of conventional design, with the pen being conditioned in a writing mode or a monitoring mode by a pen write control solenoid, responsive to the computer, and mechanically coupled to the pen. A solenoid is in the normal energized, pen lifted and disabled position. The solenoid, when non-energized, will allow the pen to lower into contact with the paper or other writing medium on the X-Y plotter.

The computer will produce two pen control signals which determine the writing status of the pen, the signals being identified as format up and format down logic which produce the logic signals on the solenoid in response to corresponding binary coded input signals from the computer, the two signals operating to disable or enable the pen.

Figure 8:
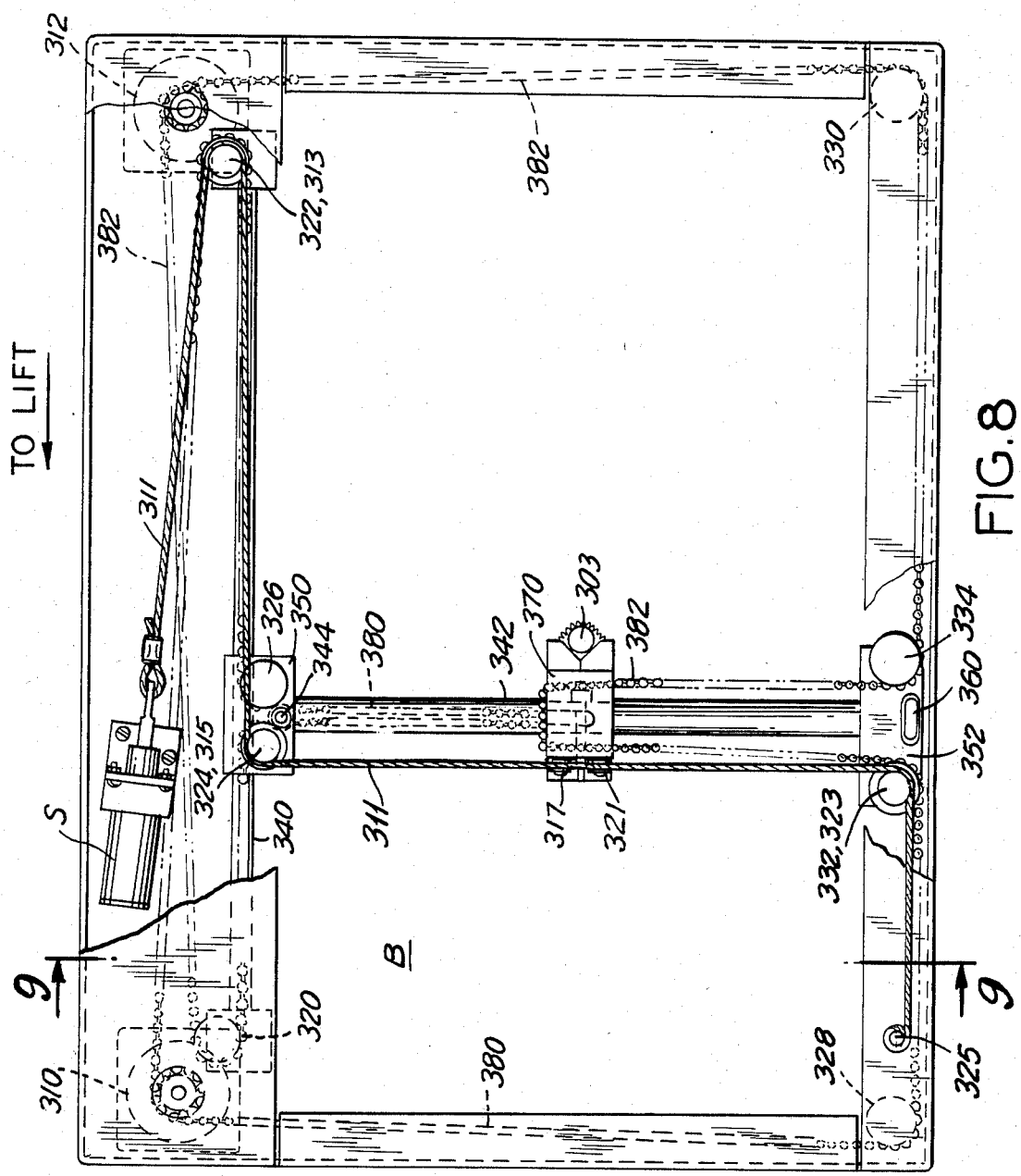
FIG. 8 is a view in top plan showing the system of the invention as exemplified in a plotting pen.
Figure 9:
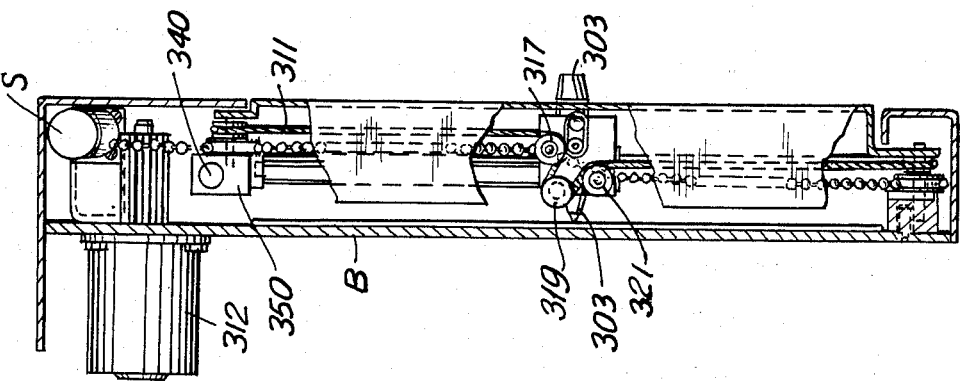
FIG. 9 is a view on the line 9—9 of FIG. 8.
Figure 10:
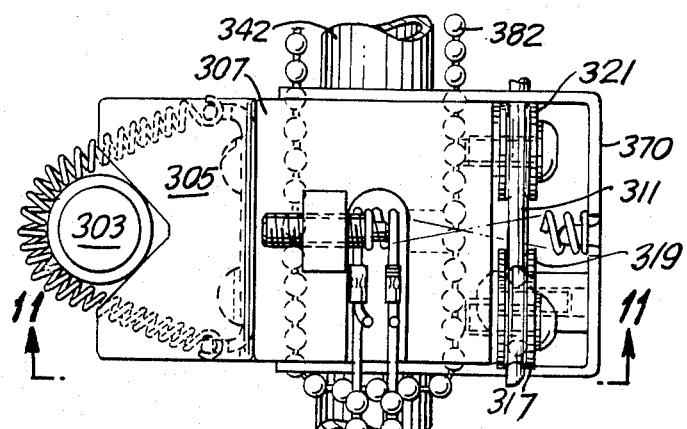
FIG. 10 is an enlarged view in top plan of the carriage.
Figure 11:
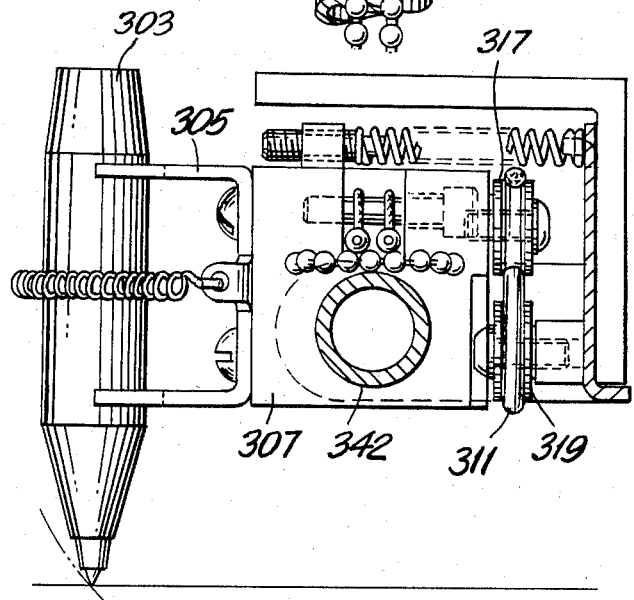
FIG. 11 is an enlarged view of the carriage taken on line 11—11 of FIG. 10 with the pen or stylus shown in the enabled position.
Figure 13:
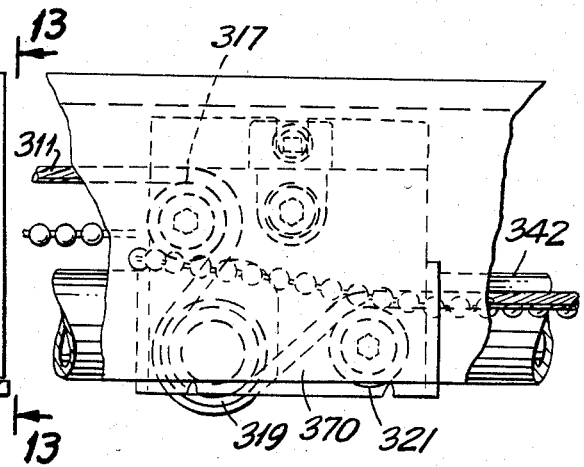
FIG. 13 is a fragmentary view in side elevation taken on line 13—13 of FIG. 11.
Figure 12:
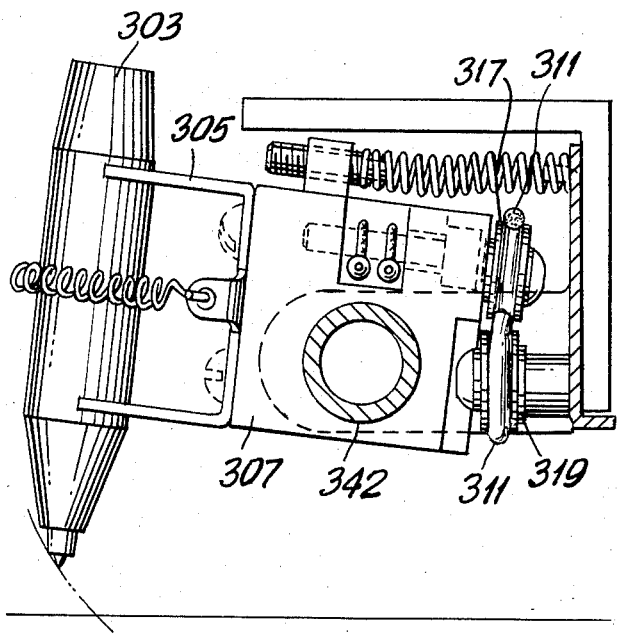
FIG. 12 is the view similar to FIG. 11 showing the pen or stylus in the disabled position.
Figure 14:
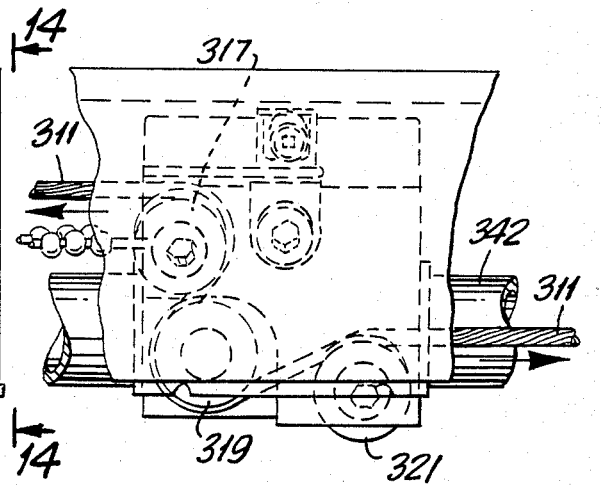
FIG. 14 is a fragmentary view in side elevation taken on line 14—14 of FIG. 12.

A stylus or pen 303 is releasably mounted on or held relative to a clamp 305 by a spring 305', the clamp being fixed to a body 307 which is sleeved upon movable guide rail 342 so as to be swingable relative thereto responsively to the actuation of an actuator 311 which, as shown in FIGS. 8 and 11, is tied to a solenoid S and is entrained over a pulley 313 coaxial with pulley 322, over a pulley 315 coaxial with pulley 324, over a pulley 317 mounted on body 307, over a pulley 319 mounted on carrier 370, over a pulley 321, and thence outwardly therefrom over a pulley 323 coaxial with pulley 332 with its other terminus being tied to a post 325 mounted on base B.

A pair of fixed-position drive motors 310 and 312 are mounted on a base B. Pulleys 320, 322, 324, 326, 328, 330, 332 and 334 are disposed as in the case of the FIG. 1 basic concept pulleys, pulleys 320 and 322 being mounted on base B.

A fixed guide rail 340 is fixed relative to base B and a movable guide rail 342 is pivotable relative thereto by means of a pivot 344.

Spaced carriages 350 and 352 are sited on opposite sides of the base. Carriage 350 mounts pulleys 324 and 326 and is movable along fixed guide rail 340. Carriage 352 mounts pulleys 332 and 334.

A support wheel 360 is mounted on carriage 352.

A driven carrier 370 is movable along and relative to movable guide rail 342.

Chain parts 380 and 382 are entrained about the respective drive wheels of the drive motors and the pulleys for driving and orienting the carrier.

Chain part 380 threads outwardly from a fixed post on carrier 370, over pulleys 326 and 322, over the drive wheel of drive motor 310, over pulleys 328 and 332, and returnably to the carrier where it is looped around a retainer and then, as chain part 382, over pulleys 334 and 330, over the drive wheel of drive motor 312, over pulleys 320 and 324 and returnably to the carrier where the opposite terminus of the chain is fixed to a post.

The chain parts cooperantly allow a free translation of carrier 370 while forcing the carrier to be held rigidly in any angular orientation and this is so whether one drive motor is rotating while the other drive motor is not rotating or both drive motors are rotating simultaneously. Whatever the rotation or non-rotation of the drive motors, the motion is such that as one chain part is driven the other chain part is driven responsively wherefor any desired positioning of the carrier is possible.

Reference is now made to FIGS. 15–18, same representing an exemplifcation of an X-Y plotter over a vertically disposed planar surface represented by a wall Q of a building having a window P enclosed therewithin and a mechanism embodying the spirit of the invention, the drive being exploited to drive a paint spray device PS to a correct position relative to the window, it could be a billboard as easily, combined with a means for effecting movement of the paint spray drive on command according to signals from a computer, enabling it or opening it into operational mode for the painting position and disabling it or closing it into non-operational mode for the non-painting position.

A pair of fixed position drive motors 410 and 420 are mounted on a base rail BR serving as the fixed guide rail. Pulleys 422, 424, 426, 428, 430, 432, 434 are disposed as in the case of the FIG. 1 basic concept, pulleys 420 and 422 being mounted on base rail BR, pulleys 424 and 426 being mounted on a carriage 450, pulleys 428 and 430 being mounted on a top cross rail CR, pulleys 432 and 434 being mounted on a carriage 452.

Base rail BR serves as a fixed guide rail 440 and a movable guide rail 442 is pivotable relative thereto by means of a pivot 414.

Carriage 450 is movable relative to base rail BR by means of rollers 453 which embrace the base rail on opposite side faces thereof.

Carriage 450 mounts pulleys 424 and 426.

Carriage 452 mounts pulleys 432 and 434 and is movable relative to top cross rail CR by means of rollers 455 which embrace the base rail on opposite side faces thereof.

A driven carrier 470 is movable along and relative to movable guide rail 442.

Chain parts 480 and 482 are entrained about the respective drive wheels of the drive motors and the pulleys for driving and orienting the carrier.

Chain part 480 threads outwardly from a fixed position on carrier 470 over pulleys 426 and 422, over the drive wheel of drive motor 410, over pulleys 428 and 432, and returnably to the carrier where it is looped around a retainer and then, as chain part 482, over pulleys 434, 430 and 412, over drive wheel 420, over pulley 424 and returnably to the carrier where the opposite terminus is fixed to a post.

The chain parts cooperantly allow a free translation of carrier 470 while forcing the carrier to be held rigidly in any angular orientation and this is so whether one drive motor is rotating while the other drive motor is not rotating or both motors are rotating simultaneously.

Whatever the rotation or non-rotation of the drive motors, the motion is such that as one chain part is driven the other chain part is driven responsively wherefor any desired positioning of the carrier is possible.

The painting device comprising the usual spray nozzle and paint and air lines PL and AL respectively is mounted on the carrier 470 by means of cradles 405 mounted on and projecting outwardly from a base plate 407, which base plate is fixed to carrier 470.

The painting device is cradled relative to cradle 405 and is clamped relative to the base plate by a clamp 409 which may be threadedly engaged with the base plate so as to be manually tightenable against the painting device.

Figure 19:
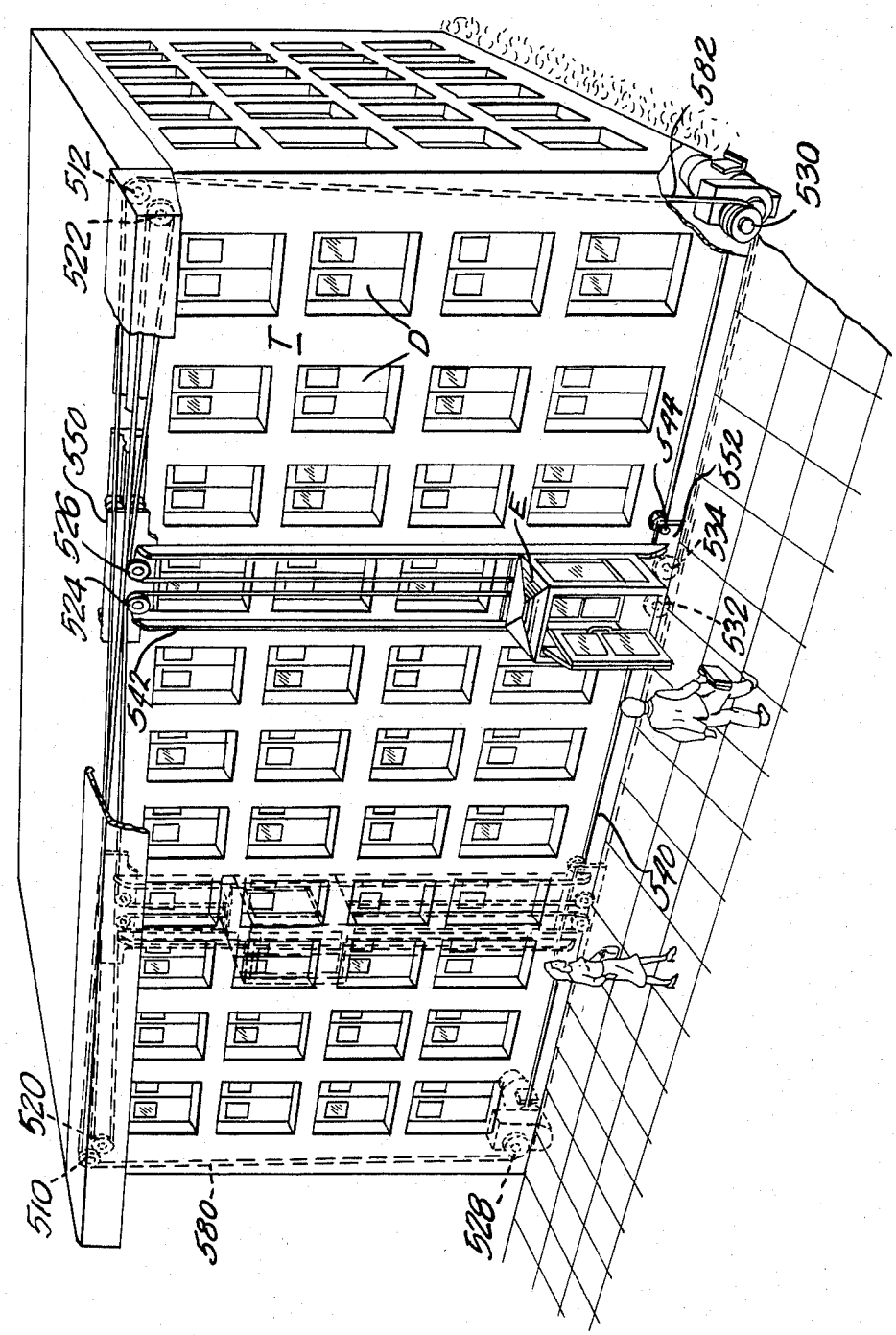
FIG. 19 is a perspective view of the principles of the invention as applied to an elevator.

Reference is now made to FIG. 19, same representing an exemplification of an X-Y plotter over a vertically disposed planar surface represented by a wall T of a building having a plurality of elevator type doors D on a plurality of levels, each door leading to a room of the building.

The mechanism embodies the spirit of the invention, the drive being exploited to position a carrier in the form of an elevator car E to a desired position relative to one of the doors D on one of the levels or floors of the building according to signals delivered thereto.

A pair of fixed position drive motors 510 and 512 are fixed relative to the building at opposite corners of the side wall.

Pulleys 520, 522, 524, 526, 510, 512, 532 and 534 are disposed as in the case of the FIG. 1 basic concept.

Pulleys 510, 512, 520 and 522 are mounted on a top rail; pulleys 524 and 526 are mounted on a top carriage. Drive motors 528 and 530 are mounted at the base corners of building. Pulleys 532 and 534 are mounted on a lower carriage.

A fixed guide rail 540 is fixed relative to base rail and a movable guide rail 542 is pivotable relative thereto by means of a pivot 544.

Carriages 550 and 552 are spaced from each other and are disposed at the bottom and the top of the framing.

Carriage 550 mounts pulleys 524 and 526 and is movable along fixed guide rail 540.

Carriage 552 mounts pulleys 532 and 534.

Chain parts 580 and 582 are entrained about the respective drive wheels of the drive motors and the pulleys for driving and orienting the carrier.

Chain part 580 threads outwardly from a fixed position on carrier 470, over pulleys 526, 522 and 510, over the drive wheel of drive motor 528, over pulley 532, and returnably to the carrier where it is looped around a retainer and then, as chain part 582, over pulley 534, over the drive wheel of drive motor 530, over pulleys 512, 520 and 524 and returnably to the carrier where the opposite terminus is fixed to a post.

The chain parts cooperantly allow a free translation of carrier 570 while forcing the carrier to be held rigidly in any angular orientation, whether one motor is rotative while the other is stationary or both motors are simultaneously rotative.

Whatever the rotation or non-rotation of the drive motors the motion is such that as one chain part is driven the other chain part is driven responsively wherefore any desired positioning of the carrier is possible.

We claim:

1. A positioning system comprising:
a stationary member,
a first guide means fixed relative to the stationary member,
a second guide means having one end hingedly connected to the first guide means and the other end being free of the first guide means,
the first and second guide means being substantially mutually perpendicular,
a first carriage being linearly reciprocable along the first guide means in an X direction,
a second carriage fixed to the free end of the second guide means,
a carrier being reciprocable linearly along the second guide means in a Y direction,
a pair of spaced bidirectional drives mounted on the stationary member,
a plurality of spaced guide pulleys,
a single drive chain defining a closed loop having opposite free ends fixed to the carrier and trained over and operatively engaging the first and second carriages and the drives and pulleys, a retainer on the carrier for the shifting entrainment therearound of the drive chain intermediate the opposite free ends thereof in the displacement of the first and second carriages along the respective guide means and of the carrier along the second guide means in the attainment of any desired angular and translational orientation of the carrier relative to the stationary member, and
means for selectively rendering each of the drives operative and inoperative for positioning the carrier at any desired coordinate position on an X-Y coordinate plane.

2. In the positioning system of claim 1, the drives being selectively energizable for actuation in either direction of rotation and deenergizable for non-rotation to effect a desired direction of displacement of the carrier in the X-Y coordinate plane.

3. In the positioning system of claim 1, wherein the carrier is displaced in a first direction when the drives are operative in a first condition of rotational direction and in a second direction reverse to the first direction when the drives are operative in a second condition of rotational direction opposite to the first condition of rotational direction.

4. In the positioning system of claim 1, wherein the drives cooperate conjointly to drive the chain for displacement of the carrier in a first direction and for displacement of the carrier in a second direction normal to the first direction and individually one drive at a time to drive the chain and displace the carrier along a locus having components of the first and second directions.

* * * * *